United States Patent
Lee et al.

(10) Patent No.: US 9,252,409 B2
(45) Date of Patent: Feb. 2, 2016

(54) MIDDLE OR LARGE-SIZED BATTERY PACK OF NOVEL AIR COOLING STRUCTURE

(71) Applicant: LG CHEM, LTD., Seoul (KR)

(72) Inventors: Jin Kyu Lee, Busan (KR); Dal Mo Kang, Daejeon (KR); Yongshik Shin, Daejeon (KR); Bumhyun Lee, Seoul (KR); Chae Ho Chung, Daejeon (KR); Jongmoon Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/252,521

(22) Filed: Apr. 14, 2014

(65) Prior Publication Data

US 2014/0227577 A1 Aug. 14, 2014

Related U.S. Application Data

(63) Continuation of application No. 12/673,471, filed as application No. PCT/KR2009/004997 on Sep. 4, 2009.

(30) Foreign Application Priority Data

Dec. 12, 2008 (KR) .................. 10-2008-0126787

(51) Int. Cl.
| | |
|---|---|
| *H01M 2/10* | (2006.01) |
| *H01M 10/613* | (2014.01) |
| *H01M 10/6566* | (2014.01) |
| *H01M 10/617* | (2014.01) |
| *H01M 10/625* | (2014.01) |
| *H01M 10/647* | (2014.01) |
| *H01M 10/6557* | (2014.01) |
| *H01M 10/6563* | (2014.01) |
| *B60L 11/18* | (2006.01) |
| *H01M 10/6565* | (2014.01) |
| *H01M 10/637* | (2014.01) |
| *H01M 10/654* | (2014.01) |
| *H01M 10/663* | (2014.01) |

(52) U.S. Cl.
CPC ......... *H01M 2/1077* (2013.01); *B60L 11/1864* (2013.01); *B60L 11/1874* (2013.01); *B60L 11/1877* (2013.01); *B60L 11/1879* (2013.01); *H01M 2/1083* (2013.01); *H01M 10/5004* (2013.01); *H01M 10/5008* (2013.01); *H01M 10/5016* (2013.01); *H01M 10/5032* (2013.01); *H01M 10/5059* (2013.01); *H01M 10/5067* (2013.01); *H01M 10/5071* (2013.01); *H01M 10/5073* (2013.01); *H01M 10/613* (2015.04); *H01M 10/617* (2015.04); *H01M 10/625* (2015.04); *H01M 10/637* (2015.04); *H01M 10/647* (2015.04); *H01M 10/654* (2015.04); *H01M 10/6557* (2015.04); *H01M 10/6563* (2015.04); *H01M 10/6565* (2015.04); *H01M 10/6566* (2015.04); *B60L 2240/545* (2013.01); *H01M 10/5095* (2013.01); *H01M 10/663* (2015.04); *H01M 2220/20* (2013.01); *Y02T 10/7005* (2013.01); *Y02T 10/7011* (2013.01); *Y02T 10/7061* (2013.01)

(58) Field of Classification Search
CPC ................... H01M 10/5004; H01M 10/5016; H01M 10/5071; H01M 10/5073
USPC .................. 429/120, 148, 149, 153, 163
See application file for complete search history.

(56) References Cited

U.S. PATENT DOCUMENTS

| | | | | |
|---|---|---|---|---|
| 6,335,116 | B1 | 1/2002 | Yamane et al. | |
| 7,637,335 | B2 * | 12/2009 | Hayashi | 180/68.5 |
| 2005/0285563 | A1 | 12/2005 | Yoneda | |
| 2006/0090492 | A1 * | 5/2006 | Ahn et al. | 62/259.2 |
| 2006/0091856 | A1 | 5/2006 | Lee et al. | |
| 2007/0029966 | A1 * | 2/2007 | Lee et al. | 320/112 |
| 2007/0196728 | A1 | 8/2007 | Yang | |
| 2007/0231690 | A1 | 10/2007 | Fujita et al. | |

FOREIGN PATENT DOCUMENTS

| | | |
|---|---|---|
| CN | 1790803 A | 6/2006 |
| CN | 101322281 A | 12/2008 |
| GB | 2289977 A | 12/1995 |
| JP | 2000-223094 A | 8/2000 |
| JP | 2002-157982 A | 5/2002 |
| JP | 2003-317813 A | 11/2003 |
| JP | 2003-346924 A | 12/2003 |
| JP | 2006-185892 A | 7/2006 |
| JP | 2006-324037 A | 11/2006 |
| JP | 2006-324112 A | 11/2006 |
| JP | 2007-200712 A | 8/2007 |

(Continued)

*Primary Examiner* — Ladan Mohaddes

(74) *Attorney, Agent, or Firm* — Birch, Stewart, Kolasch & Birch, LLP

(57) ABSTRACT

A middle- or large-sized battery pack having two or more hexahedral battery modules, each including a plurality of chargeable and dischargeable plate-shaped unit cells, mounted in a pack case, wherein the battery pack removes heat generated during the charge and discharge of the unit cells using an air cooling method, the unit cells of each of the battery modules are vertically stacked such that the number of the unit cells corresponds to a height of a battery pack installation space defined in a vehicle while neighboring unit cells are spaced apart from each other such that a coolant channel is defined between the respective unit cells, the pack case is formed in a shape corresponding to the battery pack installation space in the vehicle, and a coolant for removing heat from the unit cells is introduced through at least one side of the pack case.

14 Claims, 6 Drawing Sheets

(56) References Cited

FOREIGN PATENT DOCUMENTS

| | | | |
|---|---|---|---|
| JP | 2008-097830 A | 4/2008 | |
| JP | 2008-300103 A | 12/2008 | |
| KR | 10-2007-0057344 A | 6/2007 | |
| KR | 10-2008-0025428 A | 3/2008 | |
| WO | WO 2007/064088 A1 | 6/2007 | |
| WO | WO 2007/102670 A1 | 9/2007 | |

\* cited by examiner

400a

400b

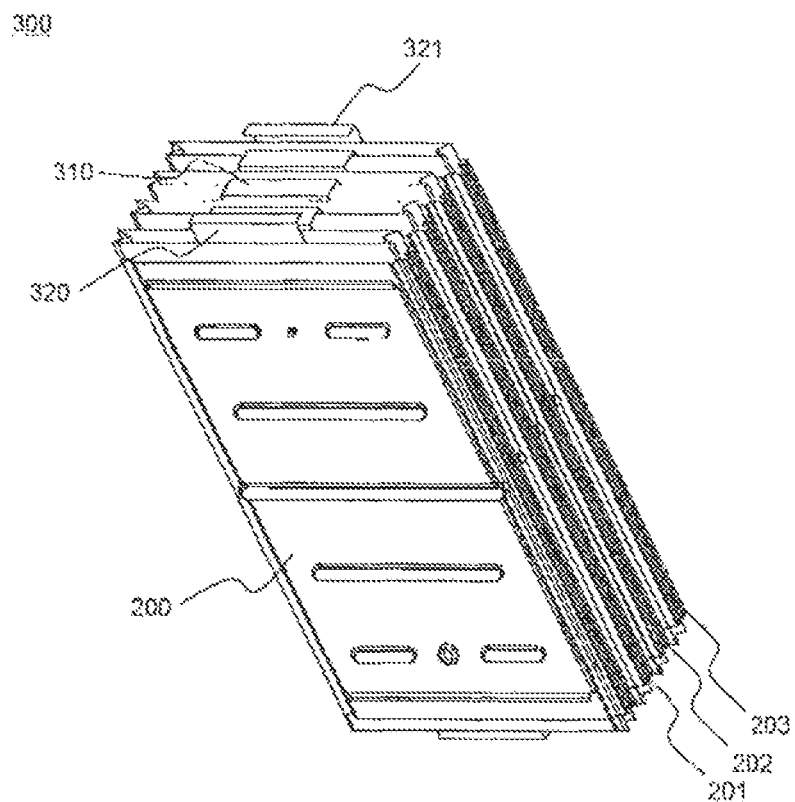

MIDDLE OR LARGE-SIZED BATTERY PACK OF NOVEL AIR COOLING STRUCTURE

CROSS-REFERENCE TO RELATED APPLICATIONS

This application is a Continuation of co-pending U.S. application Ser. No. 12/673,471, filed on Apr. 22, 2011, which is the National Phase of PCT International Application No. PCT/KR2009/004997 filed on Sep. 4, 2009, which claims priority under 35 U.S.C. 119(a) to Patent Application No. 10-2008-0126787 filed in the Republic of Korea on Dec. 12, 2008. The entire contents of all of the above applications are hereby incorporated by reference.

TECHNICAL FIELD

The present invention relates to a middle- or large-sized battery pack of a novel air cooling structure, and, more particularly, to a middle- or large-sized battery pack having two or more hexahedral battery modules mounted in a pack case, wherein the battery pack is used as a power source for driving a vehicle, has a battery capacity of 5 KWh or more, and removes heat generated during the charge and discharge of the cells using an air cooling method, the unit cells of each of the battery modules are vertically stacked such that the number of the unit cells corresponds to a height of a battery pack installation space defined in the vehicle while neighboring unit cells are spaced apart from each other such that a coolant channel is defined between the respective unit cells, the pack case is formed in a shape corresponding to the battery pack installation space in the vehicle, the hexahedral battery modules being arranged in an inner space of the pack case, and a coolant for removing heat from the unit cells is introduced through at least one side of the pack case, passes through the battery modules horizontally, and is discharged through the other side of the pack case.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEY), and plug-in hybrid electric vehicles (Plug-in HEY), which have been developed to solve problems, such as air pollution, caused by existing gasoline and diesel vehicles using fossil fuels.

Small-sized mobile device use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Preferably, the middle- or large-sized battery module is manufactured so as to have a small size and weight if possible. For this reason, a prismatic battery or a pouch-shaped battery, which can be stacked with high integration and has a small weight to capacity ratio, is usually used as a battery cell of the middle- or large-sized battery module. Especially, considerable interest is currently focused on the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

In order for the middle- or large-sized battery module to provide power and capacity required by a predetermined apparatus or device, it is necessary for the middle- or large-sized battery module to be constructed to have a structure in which a plurality of battery cells are electrically connected in series to one another, and the battery cells are stable against an external force.

Also, the battery cells constituting the middle- or large-sized battery module are secondary batteries which can be charged and discharged. Consequently, a large amount of heat is generated from the high-power, large-capacity secondary batteries during the charge and discharge of the batteries. If the heat, generated from the unit cells during the charge and discharge of the unit cells, is not effectively removed, the heat accumulates in the respective unit cells, with the result that the deterioration of the unit cells is accelerated. According to circumstances, the unit cells may catch fire or explode. For this reason, a cooling system is needed in a battery pack for vehicles, which is a high-power, large-capacity battery, to cool battery cells mounted in the battery pack.

An exemplary cooling system used in a battery pack for vehicles may be constructed to have an air cooling structure. Such an air cooling type cooling system is mainly used in a battery pack for hybrid electric vehicles, having a relatively small amount of heat generated therefrom and assisting driving power.

For a plug-in hybrid electric vehicle, on the other hand, it is necessary for the vehicle to be driven only by power supplied from a battery pack. For this reason, significant electrical load is applied to the battery pack, with the result that a relatively large amount of heat is generated from the battery pack. Consequently, a water cooling type cooling system is mainly applied to the battery pack to protect the battery pack, which is poorly resistant to high temperature.

However, the water cooled type battery pack is considerably different from the air cooled type battery pack in various aspects, such as a battery connection method, a structure in which batteries are stacked in a battery module, a temperature detection method, a voltage measurement method, etc., with the result that it is necessary to additionally develop the battery connection method and the temperature/voltage measurement method.

Consequently, there is a high necessity for a middle- or large-sized battery pack having a novel air cooling structure that is applicable to a battery pack for plug-in hybrid electric vehicles, having a large amount of heat generated therefrom, utilizing the air cooled type battery pack structure for hybrid electric vehicles.

DISCLOSURE OF INVENTION

Technical Problem

Therefore, the present invention has been made to solve the above problems, and other technical problems that have yet to be resolved.

As a result of a variety of extensive and intensive studies and experiments on the structure of a middle- or large-sized battery pack, the inventors of the present application have found that, in a limited internal structure of a vehicle in which the battery pack is installed, when the battery pack is constructed to have a structure in which a pack case is formed in a shape corresponding to a battery pack installation space in the vehicle, unit cells are vertically stacked such that the number of the unit cells corresponds to a height of the battery pack installation space, and a coolant is introduced through one side of the pack case, passes through the battery modules horizontally, and is then discharged through the other side of the pack case, it is possible to minimize temperature deviation between the unit cells and effectively remove heat accumulating between the unit cells by an air cooling type cooling method while maximally utilizing the inner space of the vehicle, thereby greatly improving efficiency and life span of the battery pack. The present invention has been completed based on these findings.

That is, it is an object of the present invention to provide a middle- or large-sized battery pack constructed to have a specific cooling structure that is capable of improving stability of the battery pack while maximizing inner space utilization of a vehicle.

Technical Solution

In accordance with one aspect of the present invention, the above and other objects can be accomplished by the provision of a middle- or large-sized battery pack having two or more hexahedral battery module, each including a plurality of chargeable and dischargeable plate-shaped battery cells or unit modules (unit cells), mounted in a pack case, wherein the battery pack is used as a power source for driving a vehicle, has a battery capacity of 5 KWh or more, and removes heat generated during the charge and discharge of the unit cells using an air cooling method, the unit cells of each of the battery modules are vertically stacked such that the number of the unit cells corresponds to a height of a battery pack installation space defined in the vehicle while neighboring unit cells are spaced apart from each other such that a coolant channel is defined between the respective unit cells, the pack case is formed in a shaped corresponding to the battery pack installation space in the vehicle, the hexahedral battery modules being arranged in an inner space of the pack case, and a coolant for removing heat from the unit cells is introduced through at least one side of the pack case, passes through the battery modules horizontally, and is discharged through the other side of the pack case.

That is, the middle- or large-sized battery pack according to the present invention, requiring a high power of 5 KWh or more to be used as a power source for driving a vehicle and using an air cooling type cooling system, is constructed to have a structure in which the unit cells are vertically stacked, such that the number of the unit cells corresponds to the height of the battery pack installation space defined in the vehicle while neighboring unit cells are space apart from each other, to constitute each battery module, and the coolant is introduced through one side of the pack case, passes through the space defined between the respective unit cells horizontally, and is discharged through the other side of the pack case, thereby uniformalizing the flow rate of the coolant flowing along a channel defined between the respective unit cells and effectively removing heat generated during the charge and discharge of the battery cells by the uniform flow of the coolant. Consequently, it is possible to improve cooling efficiency and operational performance of the unit cells.

Also, the pack case, in which the hexahedral battery modules are installed, is formed in a shape corresponding to the battery pack installation space in the vehicle, and therefore, it is possible to maximize utilization of the limited inner space of the vehicle and, at the same time, to minimize temperature deviation between the unit cells.

As previously described, each of the battery modules, which are mounted in the pack case of the middle- or large-sized batter pack according to the present invention, is manufactured by stacking a plurality of unit cells with high integration. The unit cells are vertically stacked, such that neighboring unit cells are spaced apart from each other by a predetermined distance, to remove heat generated during the charge and discharge of the unit cells. For example, the battery cells may be sequentially stacked such that neighboring battery cells are spaced apart from each other by a predetermined distance without the use of additional members. When the battery cells have low mechanical strength, on the other hand, one or more battery cells may be mounted in a predetermined receiving member, and a plurality of receiving members, in each of which the battery cells are mounted, may be stacked to constitute a battery module. In this specification, the latter is also referred to as a 'unit module'.

When a plurality of unit modules are staked to constitute a battery module, the coolant channel is defined between the battery cells and/or the unit modules to effectively remove heat accumulating between the stacked battery cells.

In particular, the coolant channel is not bent vertically but extends in the same direction as the flow of the coolant, i.e., in the horizontal direction, in the structure in which the unit cells are vertically stacked as compared with a conventional structure in which the unit cells are laterally stacked. Consequently, it is possible to minimize friction of the coolant passing through the space defined between the unit cells, thereby greatly improving cooling efficiency.

Meanwhile, each of she unit modules may be constructed in various structures. Examples will be described below.

Each of the unit modules is constructed to have a structure in which plate-shaped battery cells, each of which has electrode terminals formed at the upper and lower ends thereof, are connected to series to one another. Each of the unit modules may include two or more battery cells having the electrode terminals connected in series to one another and a pair of cell covers configured to be coupled to each other to surround outer surfaces of the respective battery cells excluding the electrode terminals.

That is, each of the unit modules may be constructed to have a structure in which two battery cells are mounted between the cell covers made of a metal material.

Each of the plate-shaped battery cells is a battery cell having small thickness and relatively large width and length to minimize the total size of the battery cells when the battery cells are stacked to constitute a battery module. In one example, each of the battery cells may be a secondary battery constructed to have a structure in which an electrode assembly is mounted in a battery case formed of a laminate sheet including a resin layer and a metal layer, and electrode terminals protrude from the upper and lower end of the battery case. Specifically, the electrode assembly may be mounted in a pouch-shaped case formed of an aluminum laminate sheet. The secondary battery with the above-described structure may also be referred to as a 'pouch-shaped battery cell.'

As previously described, two or more battery cells may be covered by the high-strength cell covers made of a metal material to constitute a unit module. The high-strength cell covers protect the battery cells exhibiting low mechanical strength and restrains the repetitive expansion and contraction fluctuation during the charge and discharge of the battery cells to prevent the separation between sealing portions of the battery cells. Consequently, it is possible to manufacture a battery module exhibiting higher safety.

The battery cells are connected in series and/or parallel to each other in each of the unit modules or between neighboring unit modules. In an exemplary example, the battery cells are arranged in series in the longitudinal direction such that the electrode terminals of the battery cells are successively adjacent to one another, neighboring electrode terminals of the battery cells are coupled to each other, two or more of the battery cells are overlapped with one another, and the overlapped battery cells are covered by the cell covers, to manufacture a plurality of unit modules.

The coupling between the electrode terminals may be achieved using various methods, such as welding, soldering, and mechanical fastening. Preferably, the coupling between the electrode terminals is achieved by welding.

A plurality of battery cells or unit modules, electrode terminals of which are connected to one another, may be stacked, preferably, in a separable case including upper and lower parts configured to be coupled in an assembly type fastening structure to constitute a rectangular battery module.

Each of the battery cells may be a lithium secondary battery represented by a nickel metal hydride secondary battery and a lithium secondary battery. In particular, the lithium secondary battery, which as high energy density and discharge voltage, is preferably used as each of the battery cells.

As previously described, the middle- or large-sized battery pack according to the present invention may have a battery capacity of at least 5 KWh, preferably from 10 KWh to 50 KWh. The middle- or large-sized battery pack having such large capacity generated heat when in used. Consequently, the middle- or large-sized battery pack according to the present invention is preferably used as a power source for electric vehicles or plug-in hybrid electric vehicles in which a plurality of battery cells is included to achieve high power and large capacity, with the result that a large amount of high-temperature heat is generated during the charge and discharge of the battery cells, and this high-temperature heat is a serious safety concern.

Meanwhile, each of the battery modules may have a different number of unit cells depending upon driving power required by a vehicle and height limit of the vehicle. For example, each of the battery modules may includes 8 to 24 unit cells.

For reference, the term 'battery module' used in this specification comprehensively means a battery system constructed to have a structure in which two or more chargeable and dischargeable battery cells or unit modules are mechanically coupled to one another and, at the same time, electrically connected to one another to provide high-power and large-capacity. Therefore, a battery module itself may constitute a whole apparatus or a part of a large-sized apparatus. For example, a large number of small-sized battery modules may be connected to one another to constitute a large-sized battery module, or a plurality of unit modules, each including a small number of battery cells, may be connected to one another.

The unit cells may be arranged in a structure in which neighboring unit cells are spaced apart from each other by a distance equivalent to 20 to 50% of the thickness of each of the unit cells such the coolant passes through the space defined between the unit cells to effectively cool the respective unit cells.

For example, when the spacing distance between the neighboring unit cells is less than 20% of the thickness of each of the unit cells, it is difficult to obtain a desired cooling effect of the coolant. On the other hand, when the spacing distance between the neighboring unit cells is greater than 50% of the thickness of each of the unit cells, the overall size of a battery module constituted by the plurality of unit cells is increased, which is not preferable.

Meanwhile, the outside of each of the battery modules is spaced apart from the inside of the pack case by a predetermined spacing width to define the coolant channel. Consequently, the coolant, introduced from one side of the pack case, uniformly cools the battery modules within a predetermined temperature deviation range while passing through the space defined between the outsides of the battery modules and the inside of the pack case.

In the above-described structure, the spacing width defined between the outsides of the battery modules and the inside of the pack case may be set within a range to uniformly cool the battery modules within the predetermined temperature deviation range and to appropriately provide the total size of the battery pack. For example, the spacing width may be equivalent to 10 to 30% of the width of each of the battery modules.

In one example, the battery pack installation space in the vehicle, in which the battery pack is installed, may be a space defined in a trunk of the vehicle at the rear of a back seat.

In a specific example, the battery pack, which will be installed in the space defined in the trunk of the vehicle at the rear of the back seat, may be constructed to have a structure in which a pair of battery modules are installed in the pack case such that one battery module is disposed spaced apart by a predetermined spacing distance from the other battery module in the lateral direction, coolant suction ports are formed at regions of the pack case corresponding to the battery modules (the left-side battery module and the right-side battery module), and a coolant discharge port is formed at a region of the pack case between the respective battery modules.

In this structure, the follow of the coolant at the coolant discharge port does not interfere with the flow of the coolant at the coolant suction ports by pressure difference when a suction fan is mounted in the coolant discharge port. This structure is preferable because it is possible to achieve efficient cooling using only one suction fan.

The left-side battery module and/or the right-side battery module may be constituted by a single battery module. Alternatively, left-side battery module and/or the right-side battery module may be constituted by two or more battery modules.

In the above-described cooling structure, the two coolant suction ports are formed at opposite sides of the pack case, respectively, and the single coolant discharge port is formed at the middle of the pack case. Consequently, the coolant, introduced into the pack case through the two coolant suction ports, passes through the coolant channel defined between the unit cells, and is discharged to the outside through the coolant discharge port without difficulty.

The coolant to effectively remove heat generated during the charge and discharge of the battery cells is introduced and discharged through the coolant suction ports and/or the coolant discharge port. The coolant suction ports and the coolant discharge port may be formed at the upper part, the lower part, and the middle part of the pack case. According to circumstances, a plurality of slit-type coolant suction ports may be formed at regions of the pack case corresponding to the respective unit cells.

A partition may be further formed in the pack case between the respective battery modules for separately guiding coolants introduced from the respective coolant suction ports to the coolant discharge port. This structure is more preferable when suction fans are mounted in the respective coolant suction ports to generate a driving force necessary to drive the coolant.

That is, the partition is formed between the left-side battery module and the right-side battery module, with the result that each of the coolant channels has an L-shaped structure. Coolants are introduced through the respective coolant suction ports, pass through the unit cells horizontally, and are easily discharged to the outside through the coolant discharge port by the partition, thereby minimizing the interference between the coolants and thus improving cooling efficiency.

In the middle- or large-sized battery pack according to the present invention, the coolant suction ports may be formed at opposite sides of the pack case, and the coolant suction ports may be perpendicular to the coolant discharge port. In this case, the total length of the coolant channel from the coolant suction ports to the coolant discharge port is minimized. That is, a T-shaped coolant channel may be generally defined in the pack case.

In the above-described cooling structure, the respective battery modules are individually cooled by the coolants introduced through the corresponding coolant suction ports, and therefore, it is possible to minimize the temperature difference between the respective battery modules.

In another example, the battery pack installation space in the vehicle may be a space defined above or below a center floor panel where a shaft interconnecting a front drive unit and a rear drive unit of the vehicle is located.

Specifically, the battery pack, which will be installed in the space defined above or below the center floor panel, may be constructed to have a structure in which two or more battery modules are mounted in the pack case such that the battery modules are arranged in the longitudinal direction in tight contact, and a coolant suction port and a coolant discharge port are formed at one side of the pack case such that a coolant is introduced through the coolant suction port, flows along one-side inner space of the pack case in the longitudinal direction, passes through the battery modules horizontally, flows along the other-side inner space of the pack case in the longitudinal direction, and is then discharged to the outside through the coolant discharge port.

When considering the size the battery pack occupies, the structure in which the battery pack is installed at the center floor panel region of the vehicle is hardly considered in the art to which the present invention pertains. However, the center floor panel region of the vehicle may be utilized as a space for battery pack installation when adopting the above-described structure in which the battery modules are arranged.

In this battery pack structure, a U-shaped coolant channel is generally defined in the pack case. In this case, a coolant is introduced through the coolant suction port located at one side of the pack case, cools the unit cells while passing through the U-shaped coolant channel, and is discharged to the outside through the coolant suction port formed at the side of the pack case where the coolant suction port is located.

In addition to the above-described U-shaped coolant channel structure, the unit cells are vertically stacked at predetermined intervals. Consequently, it is possible to minimize friction of the coolant passing through the space defined between the unit cells are compared with a conventional structure in which the unit cells are laterally stacked at predetermined intervals, thereby improving cooling efficiency.

Meanwhile, the cooling structure of the middle- or large-sized battery pack according to the present invention may be applied to the air cooling type cooling system of the battery pack used as a driving power source for plug-in hybrid electric vehicles that generate a large amount of heat, as previously described. In this case, it is preferable for the unit cells to have a temperature deviation of less than 4° C. such that the respective unit cells are uniformly cooled.

According to circumstances, the coolant suction port(s) and/or the coolant discharge port may be provided with a driving fan for generating a driving force necessary to drive the coolant such that the coolant, introduced through the coolant suction port(s), passes through the battery modules, rapidly and smoothly moves toward the coolant discharge port, and is discharged out of the battery pack through the coolant discharge port. In this structure, the coolant, introduced through the small-sized coolant suction port(s), flows rapidly by the coolant driving force generated from the driving fan such that the coolant sufficiently reaches the battery cells far away from the coolant suction port(s). Consequently, a relatively uniform flow rate distribution effect is achieved under the same coolant flow conditions.

In another exemplary example, the coolant suction port(s) may be connected to an air conditioner system of the vehicle such that cooled low-temperature air is introduced into the battery pack through the coolant suction port(s). In this structure, it is possible to more effectively cool the unit cells than in an air cooling type cooling structure using room-temperature air.

BRIEF DESCRIPTION OF DRAWINGS

The above and other objects, features and other advantages of the present invention will be more clearly understood from the following detailed description taken in conjunction with the accompanying drawings, in which:

FIG. 11 is a perspective view illustrating a unit module stack including a plurality of unit modules connected to one another.

MODE FOR THE INVENTION

Now, exemplary embodiments of the present invention will be described in detail with reference to the accompanying drawings. It should be noted, however, that the scope of the present invention is not limited by the illustrated embodiments.

Figure 1:
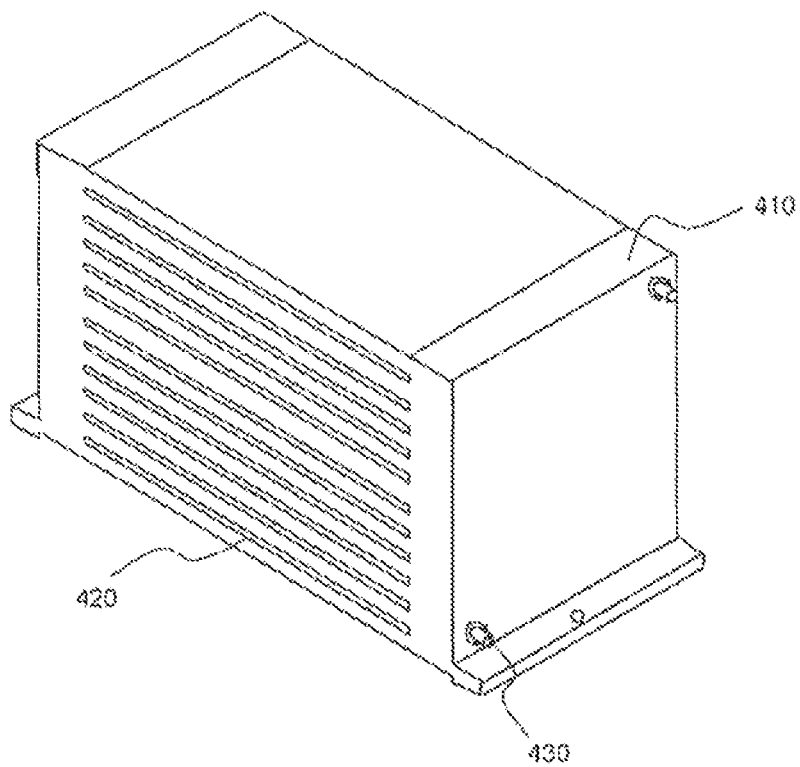
FIG. 1 is a typical view illustrating a battery module according to an embodiment of the present invention.
Figure 2:
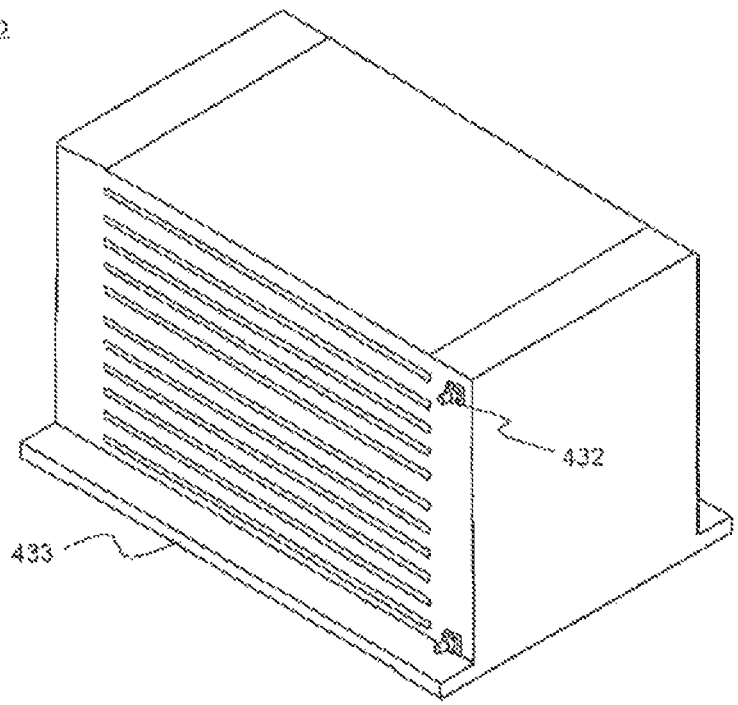
FIG. 2 is a typical view illustrating a battery module according to another embodiment of the present invention.

FIG. 1 is a typical view illustrating a battery module according to an embodiment of the present invention, and FIG. 2 is a typical view illustrating a battery module according to another embodiment of the present invention.

Referring to FIG. 1, the battery module 400a includes twelve unit modules (not shown) installed in a module case 410 such that the unit modules are arranged in parallel to one another in the vertical direction. At one side of the module case 410 are formed external input and output terminals 430 which are opposite to each other in the diagonal direction.

At the front and rear of the module case 410 are formed slits 420 which are located at positions corresponding to the respective unit modules for allowing a coolant to pass therethrough.

The battery module 400b of FIG. 2 is identical to the battery module 400a of FIG. 1 except that external input and output terminals 432 are formed at the front of the module case and bottom coupling parts 433 are formed at positions different from those of FIG. 1, and therefore, a detailed description of other components will not be given.

Figure 3:
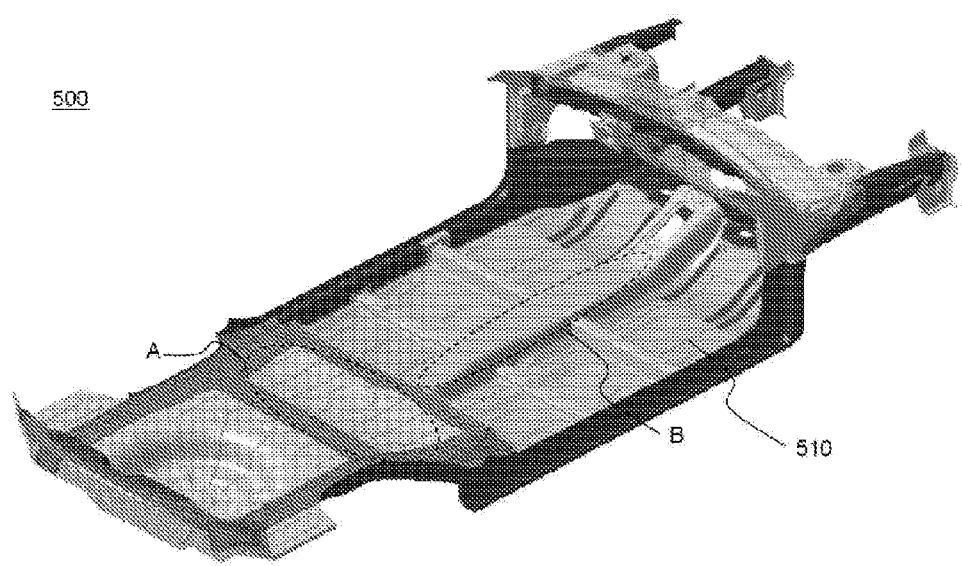
FIG. 3 is a typical view illustrating an installation space, defined in a vehicle, in which a middle- or large-sized battery pack according to an embodiment of the present invention is installed.

FIG. 3 is a typical view illustrating an installation space, defined in a vehicle, in which a middle- or large-sized battery pack according to an embodiment of the present invention is installed.

Figure 4:
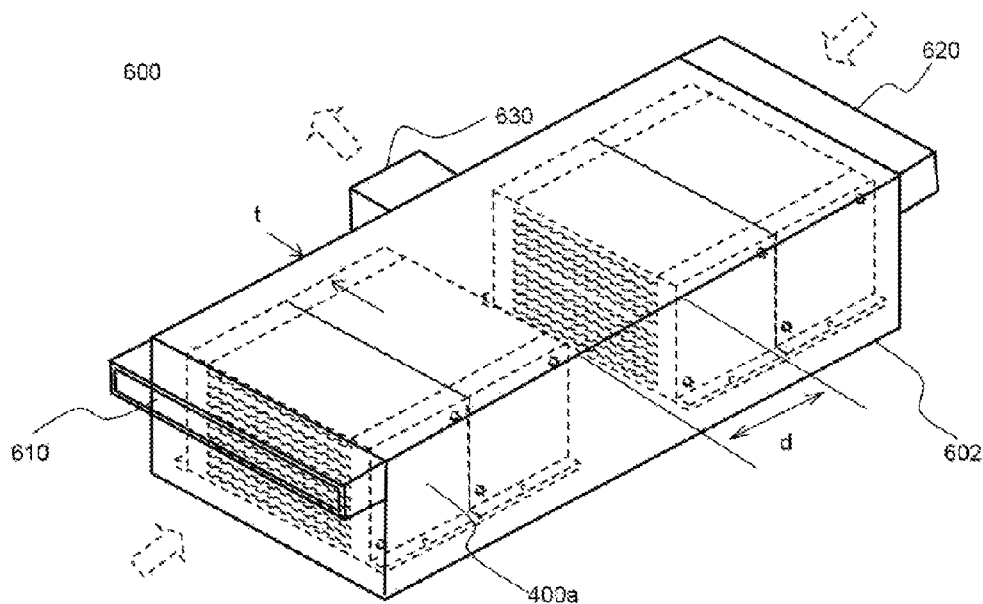
FIG. 4 is a typical view illustrating a middle- or large-sized battery pack according to an embodiment of the present invention including a plurality of the battery modules, one of which is shown in FIG. 1, installed in a pack case.
Figure 7:
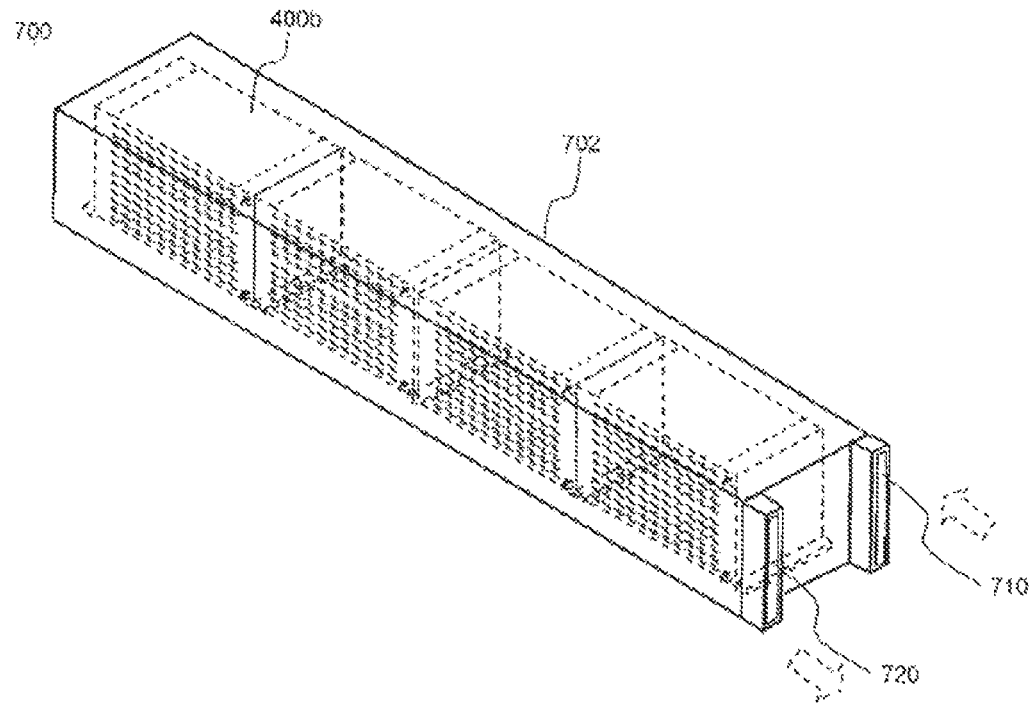
FIG. 7 is a typical view illustrating a middle- or large-sized battery pack according to another embodiment of the present invention including a plurality of the battery modules, one of which is shown in FIG. 2, installed in a pack case.

Referring to FIG. 3, a middle- or large-sized battery pack 600 as shown in FIG. 4 may be installed in a space A defined in a trunk of the vehicle at the rear of a back seat, and a middle- or large-sized battery pack 700 as shown in FIG. 7 may be installed on a top B of a center floor panel 510 where a shaft interconnecting a front drive unit and a rear drive unit of the vehicle is located.

Consequently, it may be possible to install the middle- or large-sized battery packs 600 and 700 while maximally utilizing the inner space of the vehicle.

FIG. 4 is a typical view illustrating a middle- or large-sized battery pack including a plurality of the battery modules, one of which is shown in FIG. 1, installed in a pack case.

Referring to FIG. 4 together with FIG. 3, the middle- or large-sized battery pack 600, which will be installed in the space defined in the trunk of the vehicle at the rear of the back seat is constructed to have a structure in which a pair of battery modules 400a including two battery modules 400a arranged in the lateral direction in tight contact is disposed spaced apart by a predetermined spacing distance d from another pair of battery modules 400a in the lateral direction, and the two pairs of battery modules 400a are installed in a pack case 602.

Also, two coolant suction ports 610 and 620 are formed at regions of the pack case 602 corresponding to the battery modules 400a such that the coolant suction ports 610 and 620 are disposed in opposite directions, and one coolant discharge port 630 is formed at a region of the pack case 602 between the respective pairs of battery modules 400a.

That is, the two coolant suction ports 610 and 620 are formed at opposite sides of the pack case 602, and the two coolant suction ports 610 and 620 are perpendicular to the coolant discharge port 630. Consequently, A T-shaped coolant channel is generally defined in the park case 602.

Also, a spacing width t having a size equivalent to about 10% to about 30% of the spacing distance d between the respective pairs of battery modules 400a is defined between the outside of each of the battery modules 400a and the inside of the pack case 602. Consequently, a large portion of the coolant passes through the battery modules 400a, and a small portion of the coolant passes through the space defined between the outsides of the battery modules 400a and the inside of the pack case 602. The large portion of the coolant and the small portion of the coolant are mixed with each other at the space defined between the respective pairs of battery modules 400a, and the mixture is discharged to the outside through the coolant discharge port 630.

Figure 5:
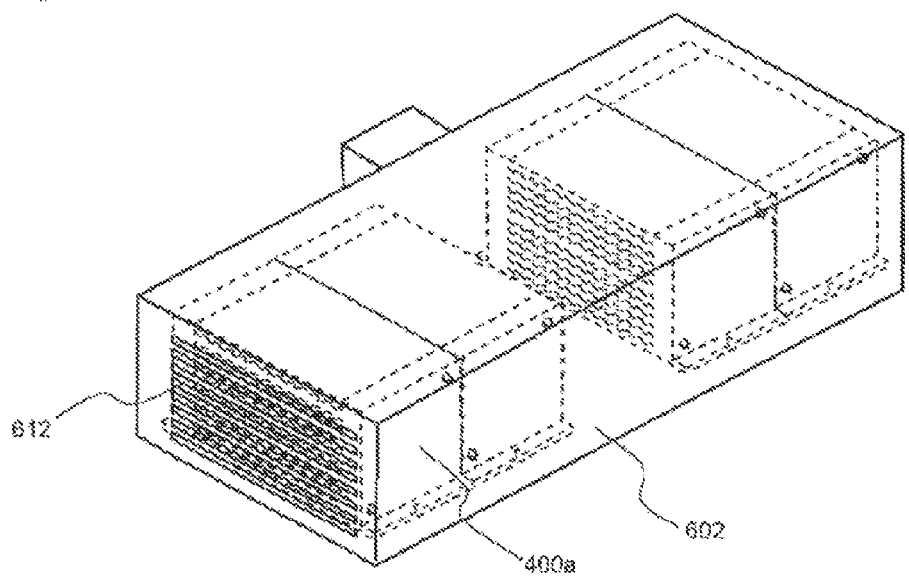
FIG. 5 is a typical view illustrating a middle- or large-sized battery pack having slit-type coolant suction ports different from the structure of FIG. 4.

According to circumstances, a plurality of coolant suction ports 612 may be formed at regions of the pack case 602 corresponding to unit cells of the battery modules 400a, as shown in FIG. 5.

Figure 6:
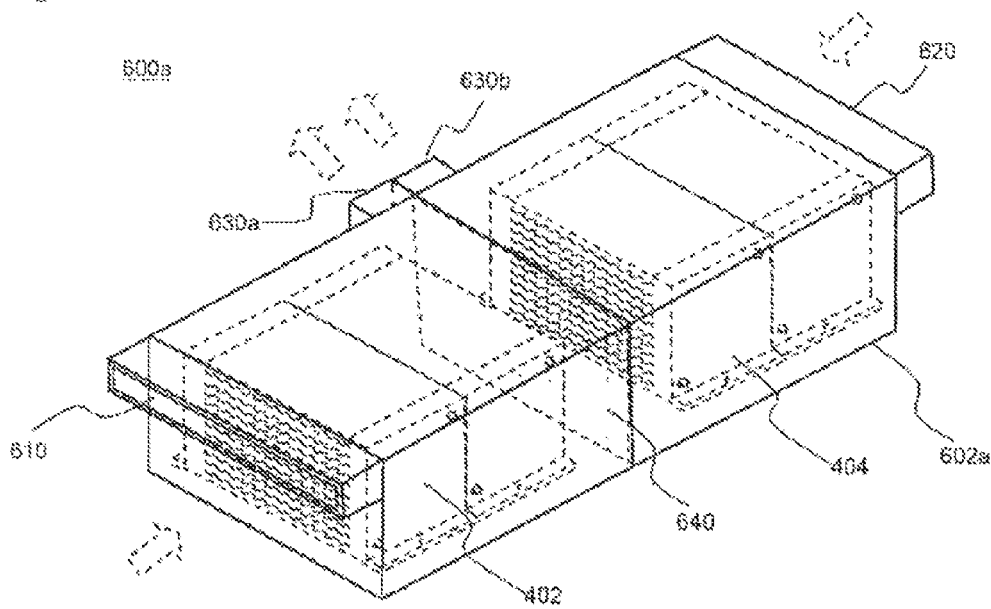
FIG. 6 is a typical view illustrating a middle- or large-sized battery pack according to a modification of FIG. 4.

FIG. 6 is a typical view illustrating a middle- or large-sized battery pack according to a modification of FIG. 4.

Referring to FIG. 6, the middle- or large-sized battery pack 600a is constructed to have a structure in which a left-side battery module group 402 and a right-side battery module group 404 are installed in a pack case 602a, and a partition 640 is formed between the left-side battery module group 402 and the right-side battery module group 404. The partition 640 extends to coolant discharge ports 630. Consequently, L-shaped coolant channels are generally defined from coolant suction ports 610 and 620 to the coolant discharge ports 630 without interference with each other. This structure is preferably used when blowing fans (not shown) are mounted in the respective coolant suction ports 610 and 620.

FIG. 7 is a typical view illustrating a middle- or large-sized battery pack according to another embodiment of the present invention including a plurality of the battery modules, one of which is shown in FIG. 2, installed in a pack case.

Referring to FIG. 7 together with FIG. 3, the middle- or large-sized battery pack 700, which will be installed in a space defined above or below the center floor panel 510, is constructed to have a structure in which four battery modules 400b are mounted in a pack case 702 such that the battery modules 400b are arranged in the longitudinal direction in tight contact.

Also, a coolant suction port 710 and a coolant discharge port 720 are formed at one side of the pack case 702. Consequently, a coolant, introduced through the coolant suction ports 710, flows along one-side inner space of the pack case 702 in the longitudinal direction. At this time, the coolant passes through the battery modules 400b horizontally. Afterwards, the coolant flows along the other-side inner space of the pack case 702 in the longitudinal direction, and is then discharged to the outside through the coolant discharge port 720.

In this structure, therefore, a U-shaped coolant channel is generally defined in the pack case 702.

Furthermore, the coolant suction port 710 is connected to an air conditioner system (not shown) of a vehicle. Consequently, cooled air, i.e., low-temperature air, is introduced through the coolant suction port 710, flows through the battery modules 400b horizontally, and is discharged through the coolant discharge port 720, thereby greatly improving cooling efficiency of the battery modules 400b as compared with an air cooling type cooling system using room-temperature air. In this case, the position of the coolant suction port 710 may be different from that shown in FIG. 4.

Figure 8:
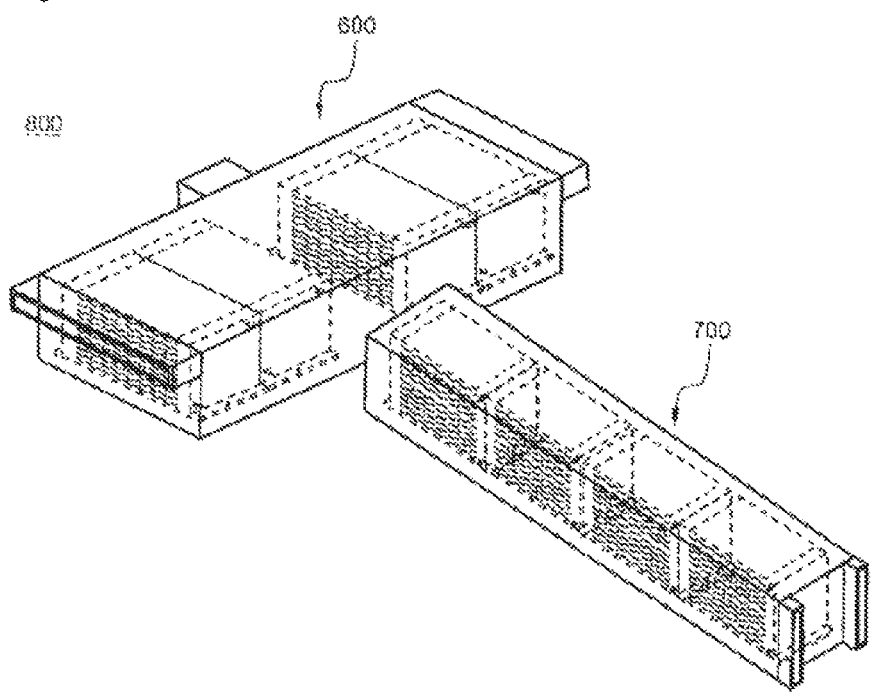
FIG. 8 is a typical view illustrating a combination of the middle- or large-sized battery packs of FIGS. 4 and 7.

FIG. 8 is a typical view illustrating a combination of the middle- or large-sized battery packs of FIGS. 4 and 7.

Referring to FIG. 8 together with FIG. 3, the middle- or large-sized battery pack 600 of FIG. 4 and/or the middle- or large-sized battery pack 700 of FIG. 7 may be simultaneously and/or selectively installed in the installation space A and/or the installation space B based on driving power required by a vehicle and an inner installation space of the vehicle. For a plug-in hybrid electric vehicle, which requires relatively high power, the middle- or large-sized battery pack 600 and the middle- or large-sized battery pack 700 are combined, and the combination 800 is installed in the installation space A and the installation space B.

Since the middle- or large-sized battery packs 600 and 700 include their own cooling systems, the middle- or large-sized battery packs 600 and 700 may be selectively and flexibly used considering the inner space of a vehicle and the disposition of other vehicle components.

Figure 9:
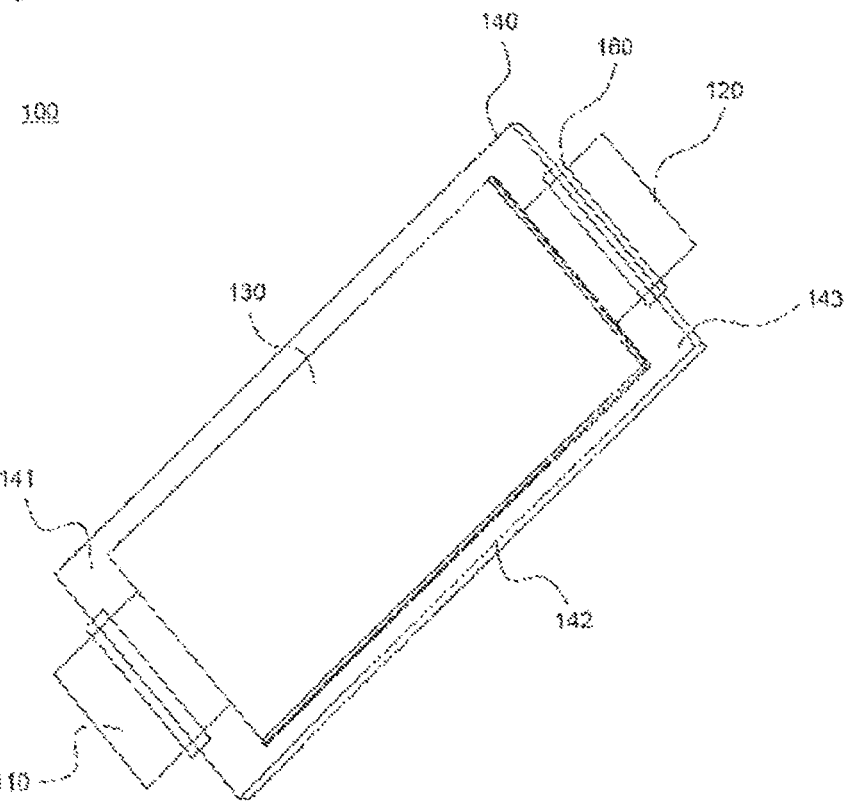
FIG. 9 is a perspective view illustrating a pouch-shaped battery cell.

FIG. 9 is a perspective view typically illustrating a pouch-shaped battery cell.

Referring to FIG. 9, the pouch-shaped battery cell 100 is constructed to have a structure in which two electrode leads 110 and 120 protrude from upper and lower ends of a battery body 130 in opposite directions, respectively. A sheathing member 140 is a two-unit member including upper and lower parts. An electrode assembly (not shown) is mounted in a receiving part defined in the sheathing member 140, and the upper and lower parts of the sheathing member 140 are attached to each other at opposite sides 142 and upper and lower ends 141 and 143 thereof, to construct the battery cell 100.

The sheathing member 140 is constructed to have a laminate structure having a resin layer/metal foil layer/resin layer. Consequently, when heat and pressure are applied to the opposite sides 142 and the upper and lower ends 141 and 143 of the sheathing member 140, the resin layers of the upper and lower parts of the sheathing member 140 are welded to each other, and therefore, the upper and lower parts of the sheathing member 140 are securely attached to each other at opposite sides 142 and upper and lower ends 141 and 143 thereof. According to circumstances, the attachment between the upper and lower parts of the sheathing member 140 may be achieved using an adhesive. At the opposite sides of the sheathing member 140, the entirety of the resin layers of the upper and lower parts of the sheathing member 149 are directly attached to each other, and therefore, uniform sealing is achieved by welding at the opposite sides of the sheathing member 140. On the other hand, the electrode leads 110 and 120 are located at the upper and lower ends 141 and 143 of the sheathing member 140, while protruding from the upper end 141 and the lower end 143 of the sheathing member 140, respectively. For this reason, thermal welding performed at the upper and lower ends 141 and 143 of the sheathing member 140, while film-type sealing members 160 are interposed between the electrode leads 110 and 120 and the sheathing member 140, to improve sealability considering the thickness of the electrode leads 110 and 120 and the difference in material between the electrode leads 110 and 120 and the sheathing member 140.

Figure 10:
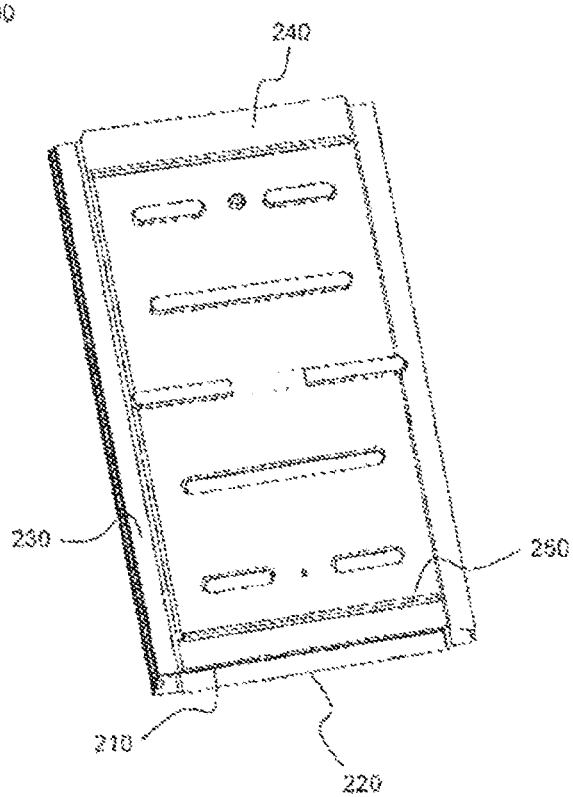
FIG. 10 is a perspective view illustrating a cell cover to which battery cells, one of which is shown in FIG. 9, will be mounted to constitute a unit module.

FIG. 10 is a perspective view illustrating a cell cover to which two battery cells, one of which is shown in FIG. 9, will be mounted to constitute a unit module.

Referring to FIG. 10, two pouch-shaped battery cells (not shown) as shown in FIG. 9 are mounted in the cell cover 200, which complements mechanical strength of the battery cells and allows the battery cells to be easily installed in a module case (not shown). Electrode terminals located at one side of one of the battery cells are connected in series to those located at one side of one of the battery cell, and the connected electrode terminals of the two battery cells are bent such that the two battery cells are disposed in tight contact. In this state, the two battery cells are mounted in the cell cover 200.

The cell cover 200 includes a pair of cover members 210 and 220 which are configured to be coupled to each other. The cover members 210 and 220 are formed of a high-strength metal sheet. At the outer surfaces adjacent to left and right sides of the cell cover 200 are formed steps 230 to easily fix the unit module. At the outer surfaces adjacent to upper and lower ends of the cell cover 200 are formed steps 240 to easily fix the unit module. Also, fixing parts 250 are formed at the upper and lower ends of the cell cover 200 in the lateral direction such that the cell cover 200 is easily mounted in the module case (not shown).

FIG. 11 is a perspective view typically illustrating a unit module stack including a plurality of unit modules connected to one another.

Referring to FIG. 11, the unit module stack 300 includes four unit modules 200, 201, 202, and 203. Since two battery cells (not shown) are mounted in each of the unit modules 200, 201, 202, and 203, the unit module stack 300 includes a total of eight battery cells. Electrode terminals are connected in series to each other between the respective battery cells and between the respective unit modules. Electrode terminal connections 210 are bent in the section shape of 'ㄷ'. Outside electrode terminals 320 and 321 of the outermost unit modules 200 and 203 are bent inwardly in the sectional shape of 'ㄱ' while protruding slightly more than the other electrode terminal connections 310.

According to circumstances, the electrode terminal connections 300 may not be bent in the shape of 'ㄷ' but may be disposed in tight contact.

INDUSTRIAL APPLICABILITY

As is apparent from the above description, the middle- or large-sized battery pack according to the present invention is constructed such that the pack case is formed in a shape corresponding to a battery pack installation space in a vehicle, the unit cells are vertically stacked such that the number of the unit cells corresponds to the height of the battery pack installation space, and a coolant is introduced through one side of the pack case, passes through the battery modules horizontally, and is then discharged through the other side of the pack case. Consequently, the present invention has the effect of minimizing temperature deviation between the unit cells and effectively removing heat accumulating between the unit cells using an air cooling type cooling method while maximizing the inner space utilization of the vehicle, thereby greatly improving efficiency and life span of the battery pack.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack having two or more hexahedral battery modules, each including a plurality of chargeable and dischargeable plate-shaped battery cells or unit modules (unit cells) within a battery module case, mounted in a pack case, wherein the battery pack is used as a power source for driving a vehicle, has a battery capacity of 5 KWh or more, and removes heat generated during the charge and discharge of the unit cells using an air cooling method, the unit cells of each of the battery modules are vertically stacked within the battery module such that the number of the unit cells corresponds to a height of a battery pack installation space defined in the vehicle while neighboring unit cells within the battery module are spaced apart from each other such that a coolant channel is defined between the respective unit cells within the battery module to minimize friction of the coolant passing through the space defined between the respective unit cells, the pack case is formed in a shape corresponding to the battery pack installation space in the vehicle, the hexahedral battery modules being arranged in an inner space of the pack case, a coolant for removing heat from the unit cells is introduced through at least one side of the pack case at a first end of the battery pack, passes through the battery modules horizontally, and is discharged through the other side of the pack case at the first end, the battery pack, installation space in the vehicle is a space defined above or below a center floor panel where a shaft interconnecting a front drive unit and a rear drive unit of the vehicle is located, located, and the battery pack, which is installed in the space defined above or below the center floor panel, and is constructed to have a structure in which two or more battery modules are mounted in the pack case such that the battery modules are arranged in the longitudinal direction in tight contact, and a coolant suction port and a coolant discharge port are formed at one side of the pack case such that a coolant is introduced through the coolant suction port, flows along one-side inner space of the pack case in the longitudinal direction, passes through the battery modules horizontally, flows along the other-side inner space of the pack case in the longitudinal direction, and is then discharged to the outside through coolant discharge port.

2. The battery pack according to claim 1, wherein each of the unit modules is constructed to have a structure including two or more battery cells having electrode terminals connected in series to one another and a pair of cell covers configured to be coupled to each other to surround outer surfaces of the respective battery cells excluding the electrode terminals.

3. The battery pack according to claim 2, wherein each of the unit modules is constructed to have a structure in which two battery cells are mounted between the cell covers made of a metal material.

4. The battery pack according to claim 1, wherein each of the battery cells is constructed to have a structure in which an electrode assembly is mounted in a pouch-shaped case including a resin layer and a metal layer.

5. The battery pack according to claim 1, wherein each of the battery cells is a lithium secondary battery.

6. The battery pack according to claim 1, wherein the battery pack is used as a power source for electric vehicles or plug-in hybrid electric vehicles.

7. The battery pack according to claim 1, wherein each of the battery modules includes 8 to 24 unit cells.

8. The battery pack according to claim 1, wherein the unit cells are arranged such that neighboring unit cells are spaced apart from each other by a distance equivalent to 20 to 50% of the thickness of each of the unit cells.

9. The battery pack according to claim 1, wherein the outside of each of the battery modules is spaced apart from the inside of the pack case by a predetermined spacing width to define a coolant channel.

10. The battery pack according to claim 9, wherein the spacing width is equivalent to 10 to 30% of the width of each of the battery modules.

11. The battery pack according to claim 1, wherein a U-shaped coolant channel is generally defined in the pack case.

12. The battery pack according to claim 1, wherein the coolant suction port and/or the coolant discharge port is provided with a driving fan for generating a driving force necessary to drive the coolant.

13. The battery pack according to claim 1, wherein the coolant suction port is connected to an air conditioner system of the vehicle such that cooled low-temperature air is introduced into the battery pack through the coolant suction port.

14. The battery pack according to claim 1, wherein the unit cells have a temperature deviation of less than 4° C.

* * * * *